United States Patent [19] [11] Patent Number: 4,794,456
Tsinberg [45] Date of Patent: * Dec. 27, 1988

[54] HIGH-DEFINITION TELEVISION TRANSMISSION SYSTEM

[75] Inventor: Mikhail Tsinberg, Riverdale, N.Y.

[73] Assignee: North American Philips Corporation, New York, N.Y.

[*] Notice: The portion of the term of this patent subsequent to Sep. 15, 2004 has been disclaimed.

[21] Appl. No.: 59,664

[22] Filed: Jun. 8, 1987

Related U.S. Application Data

[63] Continuation of Ser. No. 856,622, Apr. 25, 1986, Pat. No. 4,694,338.

[51] Int. Cl.$^4$ .......................... H04N 7/01; H04N 7/04
[52] U.S. Cl. ....................................... 358/141; 358/11; 358/12; 358/140
[58] Field of Search ................... 358/11, 12, 140, 141, 358/142

[56] References Cited

U.S. PATENT DOCUMENTS

4,567,508  1/1986  Hulyer .................................. 358/11
4,605,950  8/1986  Goldberg et al. .................. 358/141

Primary Examiner—James J. Groody
Assistant Examiner—Michael D. Parker
Attorney, Agent, or Firm—Gregory P. Gadson

[57] ABSTRACT

A method and apparatus for transmitting a high-definition television signal containing picture information which, on display, forms first picture frames at a rate of 2n frames per second, where n is a standard number of picture frames per second formed by the picture information in a standard television signal, and having a width which is wider than that of a standard aspect ratio picture frame, said high-definition television signal having a bandwidth greater that that of a standard television signal, each of said first picture frames including a single field having m sequentially scanned scanning lines, where m is a standard number of interlaced scanning lines in each picture frame formed by the picture information in said standard television signal, in which said scanning lines are arranged in two interlaced fields. The method includes converting the high-definition television signal into a first transmission signal compatible with a standard television receiver and a second transmission signal to be combined with the first transmission signal in a high-definition televison receiver, to recreate the high-definition television signal.

7 Claims, 7 Drawing Sheets

HIGH-DEFINITION TELEVISION TRANSMISSION SYSTEM

This is a continuation of application Ser. No. 856,622, filed Apr. 25, 1986, now U.S. Pat. No. 4,694,338.

BACKGROUND OF THE INVENTION

The invention relates to a method of and a system for transmitting a high-definition television signal containing picture information which, on display, forms first picture frames at a rate of 2n frames per second, where n is a standard number of picture frames per second formed by the picture information in a standard television signal, and having a width which is wider than that of a standard aspect ratio picture frame, said high-definition television signal having a bandwidth greater than that of a standard television signal, each of said first picture frames including a single field having m sequentially scanned scanning lines, where m is a standard number of interlaced scanning lines in each picture frame formed by the picture information in said standard television signal in which said scanning lines are arranged in two interlaced fields.

One of the most disturbing characteristics of present day television is its inadequate vertical resolution as manifest on large displays by the viewers being able to discern the individual raster lines. Various systems have been proposed having an increased number of horizontal scanning lines. However, these systems are not feasible as they require an excessive amount of bandwidth (e.g. 30 MHz.). Other systems have been proposed in which additional lines are transmitted over a separate channel or are generated in the television receiver by interpolation.

One thing in common with all the above systems is an increase in cost to both the broadcaster as well as the consumer. This brings into play the marketing of the new television system. It has been shown that increased resolution alone may not be sufficient to offset the increase in cost of a television receiver to the consumer.

In response to this marketing problem, some systems propose increasing the width of the displayed picture by correspondingly increasing the aspect ration by 33.3%, from a standard aspect ration of 4:3 to 5⅓:3, combined with increasing the number of scanning lines in each picture frame and increasing the bandwidth of the luminance in the television signal by at least two times.

All of these increases necessitate the transmission of the television signal over at least two separate channels, in which a first of the channels carries a first transmission signal which is compatible with standard television receivers, and a second of the channels carries a second transmission signal which, when combined with the first transmission signal, forms a television signal which corresponds substantially to the high-definition television signal.

Each of these systems include at least one frame store at the receiver capable of storing at least one picture frame of the television signal which significantly adds to the cost of the receiver.

SUMMARY OF THE INVENTION

An object of the present invention is to provide a television system for transmitting a high-definition television signal having picture information forming, on display, picture frames having an aspect ratio which is wider than that of a standard aspect ration picture frame.

Another object of the present invention is to provide a television system for transmitting a high-definition television signal which does not require a frame store.

The above objects are achieved in a method of transmitting a high-definition television signal as set forth in the opening paragraph, characterized in that said method comprises:

converting said high-definition television signal into a first transmission signal compatible with standard television receivers and containing first picture information derived from the picture information in said high-definition television signal forming substantially a first half of the scanning lines in said first picture frames, said first picture information forming, on display, second picture frames each of which having m interlaced scanning lines in two fields and corresponding to a selected portion of said first picture frames having said standard aspect ratio;

converting said high-definition television signal into a second transmission signal containing second picture information derived from the picture information in said high-definition television signal forming substantially a second half of the scanning lines in said first picture frames and forming a portion of said first picture frames not included in said selected portion in said second picture frames, said second picture information forming, on display, third picture frames each of which having m scanning lines in two fields, whereby said first and second picture informations collectively include substantially all of the picture information in said high definition television signal;

modulating said first and said second transmission signals onto a first and a second carrier, respectively and simultaneously transmitting said first and said second modulated carriers.

The objects of the invention are also achieved in a television transmitter for transmitting a high-definition television signal as set forth in the opening paragraph, characterized in that said television transmitter comprises means for converting said high definition television signal into a first transmission signal compatible with standard television receivers and containing first picture information derived from the picture information in said high-definition television signal forming substantially a first half of the scanning lines in said first picture frames, said first pcture information forming, on display, second picture frames each of which having m interlaced scanning lines in two fields and corresponding to a selected portion of said first picture frames having said standard aspect ratio;

means for converting said high-definition television signal into a second transmission signal containing second picture information derived from the picture information in said high-definition television signal forming substantially a second half of the scanning lines in said first picture frames and forming a portion of said first picture frames not included in said selected portion in said second picture frames, said second picture information forming, on display, third picture frames each of which having m scanning lines in two fields, whereby said first and second picture informations oollectively include substantially all of the picture information in said high definition television signal;

means for modulating said first and said second transmission signals onto a first and a second carrier, respectively, and means for simultaneously transmitting said first and said second modulated carriers.

The objects of the invention are further achieved in a television receiver for simultaneously receiving said first and second transmission signals transmitted by said television transmitter, characterized in that said television receiver comprises:

means for receiving said first and second transmission signals;

first means for converting said first transmission signal into a first picture signal forming substantially a first half of the scanning lines in a display picture frame and having said standard aspect ratio corresponding to said selected portion;

second means for converting said second transmission signal into a second picture signal forming substantially a second half of the scanning lines in said display picture frame and having said standard aspect ratio corresponding to said portion not included in said selected portion; and means for combining said first and second picture signals to form a television signal which substantially corresponds to said high definition television signal.

The invention recognizes that one of the factors which significantly limited the perceived vertical resolution of standard television signals is that the picture frames formed thereby include two interlaced fields of scanning lines. The subject invention greatly increases this perceived vertical resolution and consequently decreases scan line visibility by sequentially scanning the lines in each picture frame formed by the high-definition television signal and presenting these picture frames at twice the frame rate of a standard television signal.

DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENT

Figure 1:
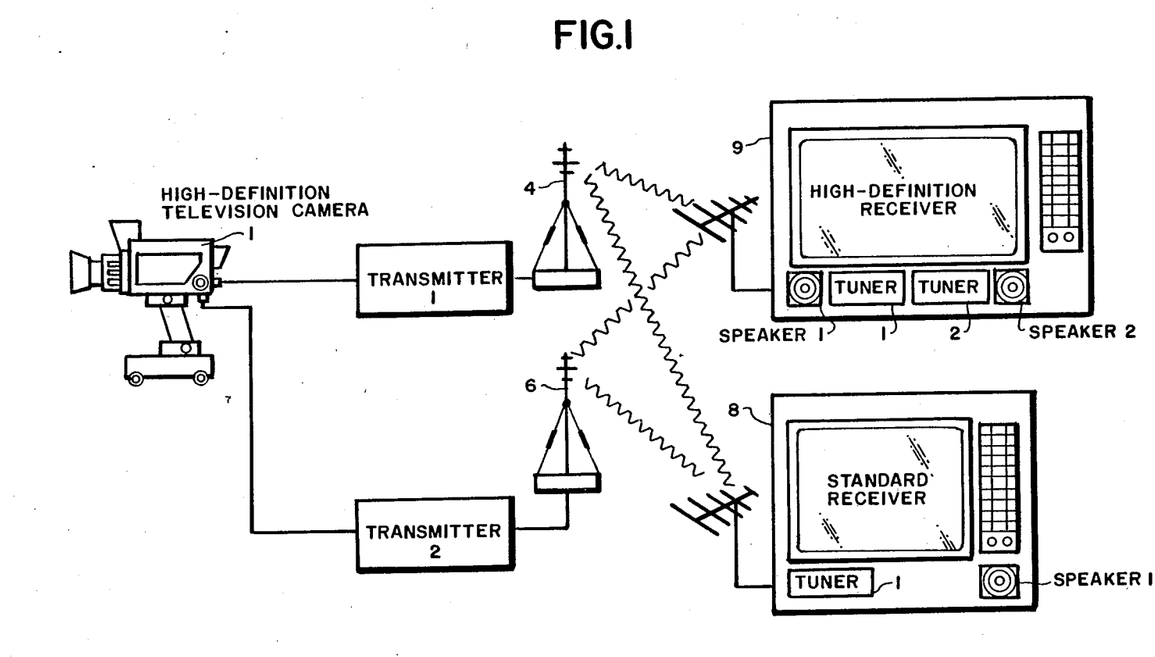
FIG. 1 shows a television transmission system incorporating the subject invention.

A television transmission system in accordance with the invention is shown in FIG. 1. A television camera 1 is adapted to generate a high-definition television signal and contains circuitry for converting the signal into a first and a second transmission signal of which at least the first transmission signal conforms with, for example, the NTSC television standard. The first television signal is then applied to a first transmitter 3 with its associated transmission channel, shown here as antenna 4, while the second transmission signal is simultaneously applied to a second transmitter 5 with its associated transmission channel, shown here as antenna 6.

The first transmission signal is compatible with standard television receiver 8 having a single tuner. However, with a high definition television receiver 9, both transmission signals may be simultaneously received, respectively, by the two tuners therein and thereupon reconverted into the high-definition television signal.

Figure 2:
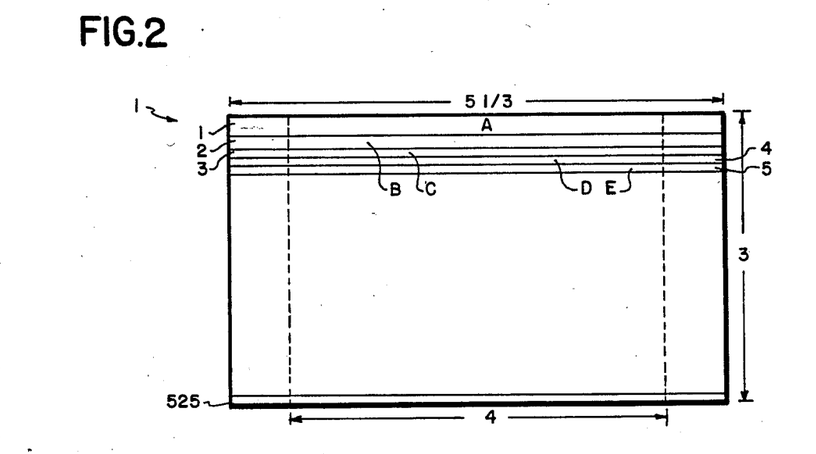
FIG. 2 shows a representation of a display obtainable with the invention.

As illustrated in FIG. 2, the subject television transmission system generates a high-definition television signal for forming a picture on display having an aspect ratio of 5⅓:3. This is in contrast with the standard displayed pictures having an aspect ratio of 4:3 which is conveniently shown in the center of the wider display picture. This 5⅓:3 aspect ratio is selected to support the simultaneous viewing of multiple standard 4:3 aspect ratio signals, without overlap, on the same display.

The picture frames formed by the high-definition television signal are not only wider than the standard television picture frame, but also include n sequentially scanned scanning lines and have a picture frame rate of 2 m, where n is a standard number of lines in a standard interlaced picture frame and m is a standard picture frame rate. The high-definition television signal also has a luminance bandwidth of at least 11.2 MHz.

Since the bandwidth of a standard television is approximately 4.2 MHz., it is necessary to convert the high-definition television signal into two transmission signals corresponding to the NTSC transmission format for transmission over standard transmission channels.

Figure 3A:
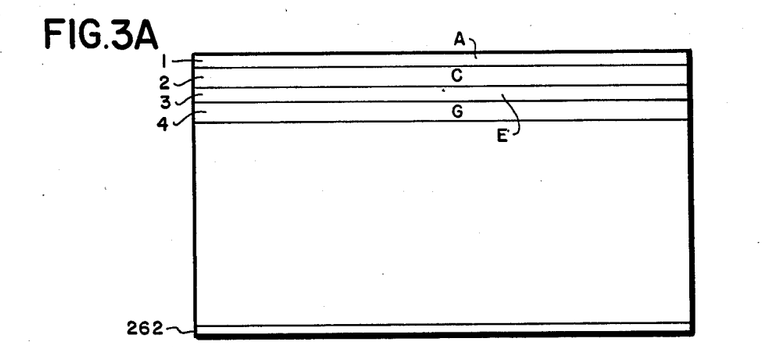
FIGS. 3A-3F show, graphically, the conversion of the high-definition television signal, on display, into two transmission signals, on display.
Figure 3B:
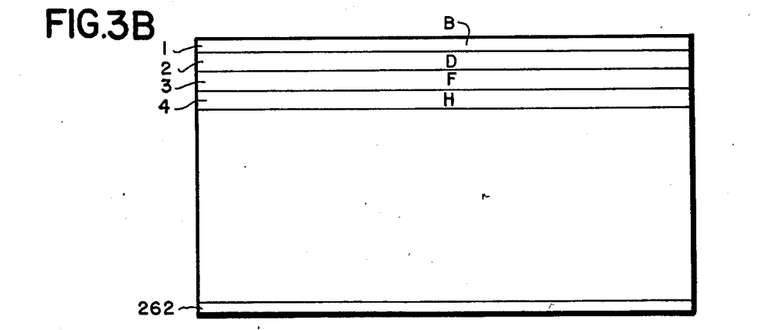
Figure 3C:
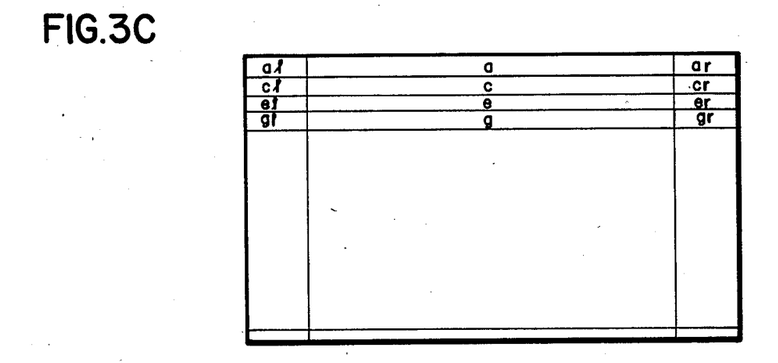
Figure 3D:
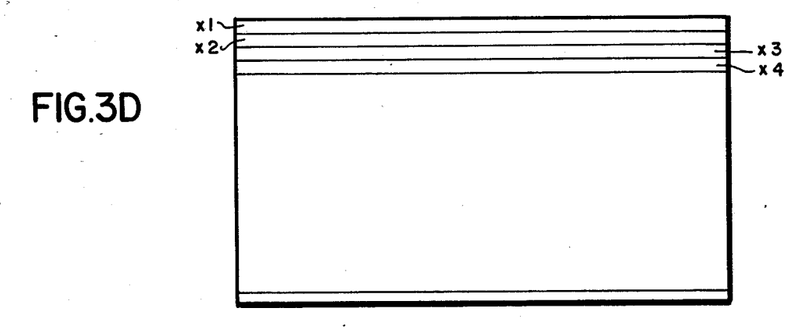

FIGS. 3A-3F illustrate the method according to the invention for converting the high-definition television signal into two transmission signals. In FIGS. 3A and 3B, the high-definition television signal is subjected to a 2:1 vertical decimation separating alternate lines in the high-definition television signal and forming these lines as two separate signals. In FIG. 3C, each line of FIG. 3A is divided, over time, into three separate sections, for example, line A is divided into sections al, a and ar; line C is divided into sections cl, c and cr; etc. In FIG. 3D, each line in FIG. 3B, along with the lines in FIG. 3A, are combined to form the lines X1, X2, X3, etc., in accordance with the formulae:

$$X1 = B - (A + C)/2$$

$$X2 = D - (E + E)/2$$

$$X3 = F - (E + G)/2 \text{ etc.}$$

Figure 3E:
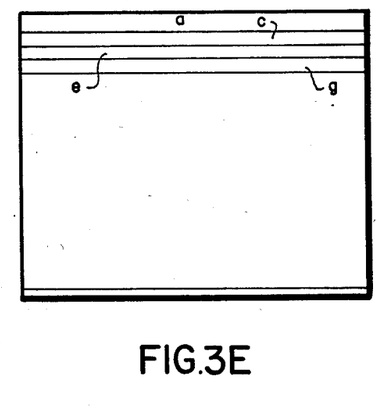
Figure 3F:
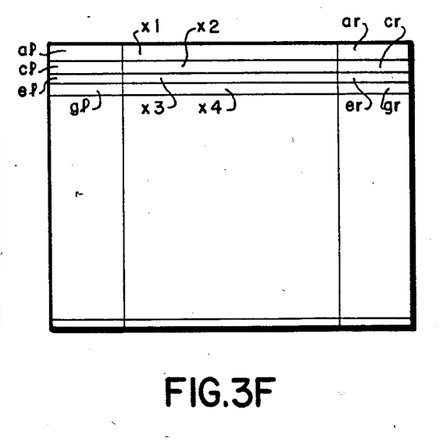

During a first frame of the high-definition television signal (see FIG. 3E), the line sections a, c, e, g, etc., in FIG. 3C, are separated and form the first transmission signal. finally, in FIG. 3F, lines X1, X2, X3, etc., are compressed in time and combined with the remaining line sections al/ar, cl/cr, el/er, gl/gr, etc., of FIG. 3C, forming the second transmission signal.

During the next frame of the high-definition television signal the lines X1, X2, X3, etc., are formed in accordance with the formulae:

$$X1 = A - B/2$$

$$X2 = C - (B+D)/2$$

$$X3 = E - (D+F)/2$$

etc.

The line sections b, d, f, h, etc., (not shown) which lie between line sections a, c, e, g, etc., in FIG. 3C, are separated and form the first transmission signal, while lines C1, X2, X3, etc., are compressed in time and combined with the remaining line sections bl/br, dl/dr, fl/fr, hl/hr, etc., (not shown) which lie between line sections al/ar, cl/cr, el/er, gl/gr, ewtc., in FIG. 3C, to form the second transmission signal.

Figure 4:
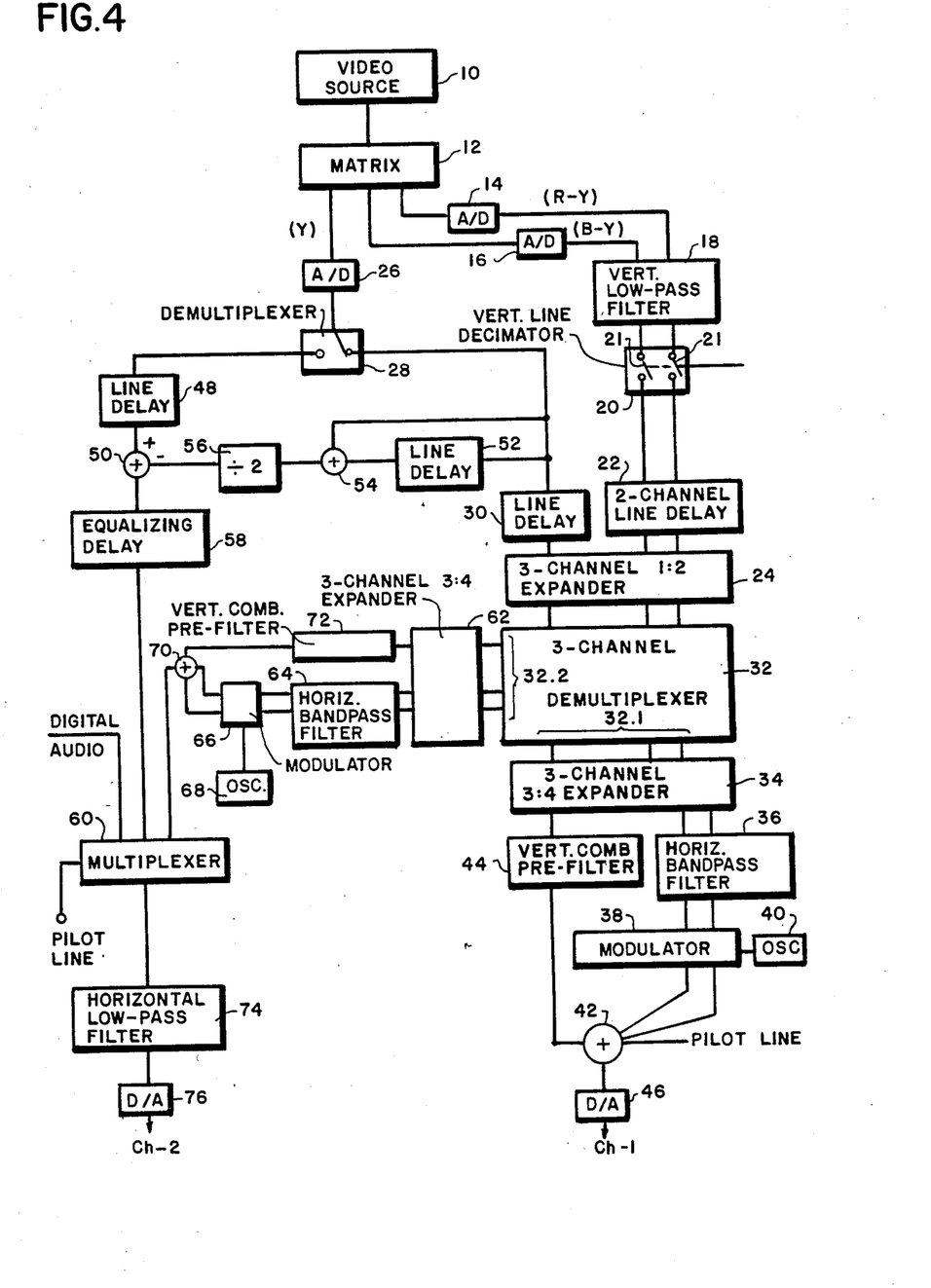
FIG. 4 shows, in block diagram form, an embodiment for converting the high-definition television signal into two transmission signals.

FIG. 4 shows, in block diagram form, an embodiment of an arrangement for converting a high-definition television signal into two transmission signals. A video source 10 provides a high-definition television signal having a luminance bandwidth in excess of 11.2 MHz., and forming, on display, sequentially scanned picture frames having 525 scanning lines and a frame rate of 60 Hz., which picture frames have an aspect ratio of 5⅓:3. An output of the video source 10, carrying the separate color signals, red (R), green (G), and blue (B), is applied to a matrix circuit 12. The matrix circuit 12 generates a luminance signal Y and two chrominance signals R-Y, B-Y.

The two chrominance signals are applied first to respective analog-to-digital converters 14 and 16 and then to a dual vertical low-pass filter 18 having a cut-off frequency of $\pi/4$, for application to a dual 2:1 vertical line decimator 20 which selects alternate lines from the input signals applied thereto. The dual vertical line decimator 20 is shown as controllable switches 21 having the switchable inputs thereof, switched at one-half the line frequency of the high-definition television signal, coupled to receive the two chrominance signals, and output terminals of the switches 21 being coupled to the outputs of the vertical line decimator 20. The outputs of the vertical line decimator 20 are applied to a 2-channel delay circuit 22 having a one line delay and then to first and second inputs of a 3-channel 1:2 time expansion circuit 24, which may be a buffer memory.

The luminance signal from the matrix circuit 12 is applied, via an analog-to-digital converter 26, to a demultiplexer 28 which receives a clock signal of one-half the line frequency of the high-definition television signal. A first output of the demultiplexer 28 carrying, for example, the lines A, C, E, etc., is coupled to a delay circuit 30, having a one line delay, and then to a third input of the 3-channel 1:2 time expansion circuit 24. This 1:2 time expansion serves the dual purpose of expanding the duration of each line in the luminance and chrominance signals to occupy substantially the full line duration of a standard television line, and also of effectively halving the bandwidth of the respective signals.

The expanded luminance and chrominance signals are then applied to a 3-channel demultiplexer 32 which separates the line segments a, c, e, g, etc., from the lines A, C, E, G, etc., as graphically shown in FIGS. 3C and 3E and applies these line segments to a first set of outputs 32.1. The outputs 32.1 are connected to a 3-channel 3:4 time expansion circuit 34, substantially similar to the time expansion circuit 24. The expanded output line segments a, c, e, g, etc., now substantially occupy the full duration of a line in a stanard television signal and have a bandwidth equal to, or less than, 4.2 MHz., the bandwidth of a standard television signal. The chrominance signals therefor are then applied to a horizontal band-pass filter 36 and then to a modulator 38 for modulation onto standard chrominance subcarriers generated by oscillator 40. The modulated output signals of modulator 38, along with a pilot line, which may be a standard VIT signal, are then applied to an adder 42. The luminance signal for the line segments a, c, e, g, etc., is applied to a vertical comb pre-filter 44, the output therefrom being also applied to the adder 42. The output of the adder 42 is applied to a digital-to-analog converter 46 which forms the first transmission signal which is compatible with standard television receivers.

Figure 5:
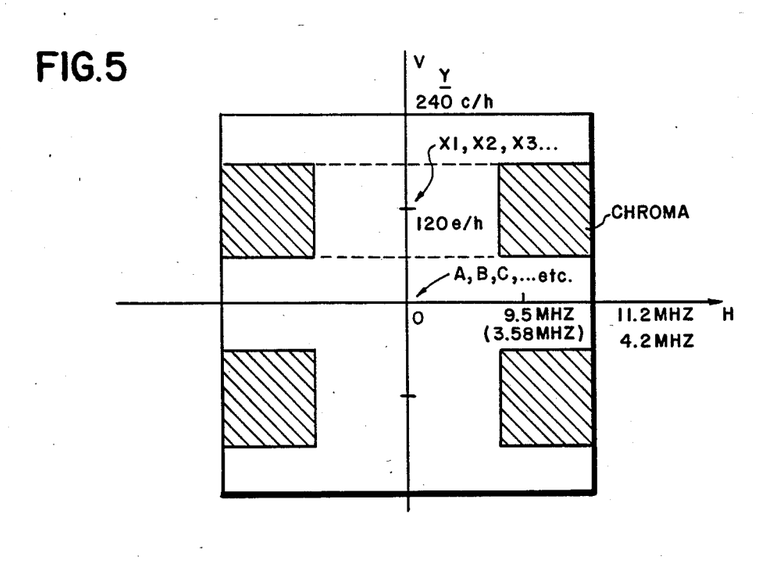
FIG. 5 shows the spectrum of a luminance signal after vertical comb pre-filtering.

The vertical comb pre-filter 44 is, in essence, a standard comb filter which, instead of having a composite video signal applied thereto for forming at the outputs thereof combed luminance and chrominance signals, has only the luminance signal applied. The output luminance signal therefro is combed and contains spaces in the spectrum thereof into which the chrominance signals may be fitted. Two-dimensional spectrum of the luminance signal, after filtering, is shown in FIG. 5.

In order to form the second transmission signal, a second output of the demultiplexer 28, carrying the lines B, D, F, H, etc., is applied to a delay circuit 48, having a one line delay, and then to a first (adding) input of a subtractor circuit 50.

The first output of the demultiplexer 28 is further applied to a line delay circuit 52, the output therefrom and the input thereto being connected to the inputs of an adder circuit 54. The output of the adder circuit 54 is divided by two in a divider circuit 56 forming the average of every two lines of luminance in the signal at the first output of the demultiplexer 28. This average signal is then applied to a second (subtracting) input of the subtractor circuit 50.

The output of the subtractor circuit 50 is then applied to a delay equalizing circuit 58 which has a fixed delay for compensating delays in other processing to be described, and then to a first input of a multiplexer 60.

The 3-channel demultiplexer 32 has a second pair of outputs 32.2 which supply the luminance and chrominance signals, respectively, of the line segments al/ar, cl/cr, el/er, gl/gr, etc. These line signals are applied to a 3-channel 3:4 time expansion circuit 62 which is substantially identical to the 3-channel 3:4 time expansion circuit 34. The chrominance outputs of the 3-channel 3:4 time expansion circuit 62 are applied to a horizontal band-pass filter 64 and then to a modulator 66 for modulation onto standard chrominance subcarriers generated by oscillator 68. These modulated signals are then applied to an adder 70. The luminance output of the 3-channel 3:4 time expansion circuit 62 is applied to a vertical comb pre-filter 74, substantially similar to pre-filter 44, and then to adder 70. The output signal from the adder 70 is applied to a second input of the multiplexer 60. The output signal from the multiplexer 60, after being filtered in horizontal low-pass filter 74, is applied to a digital-to-analog converter 76 which forms the second transmission signal.

While a standard television audio signal is included in the first transmission signal, there is sufficient room left in the second transmission signal to include digital audio signals modulated, for example, in accordance with the Digital Dolby Audio System. These audio signals are applied to a third input of the multiplexer 60. A pilot line, for matching with the pilot line inserted into the first transmission signal, is finally applied to a fourth input of the multiplexer 60.

Figure 6A:
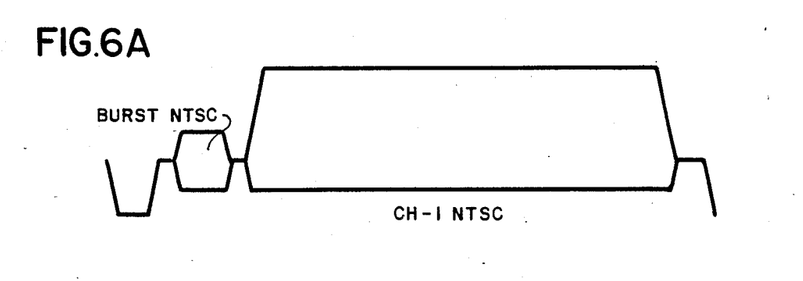
FIGS. 6A and 6B show the final transmission line format for the first and second transmission signals.
Figure 6B:
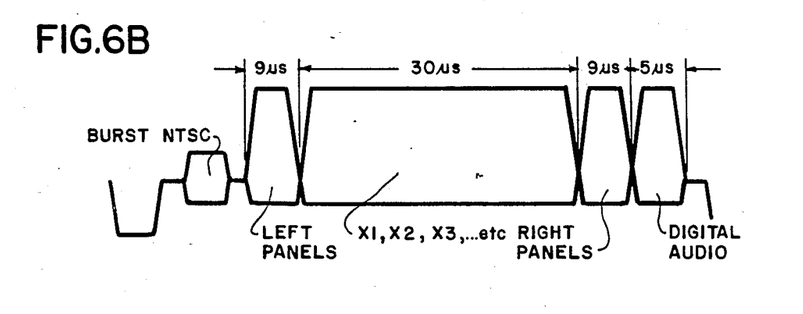

The final transmission line formats for the first and second transmission signals are shown in FIG. 6A and 6B, respectively.

Figure 7:
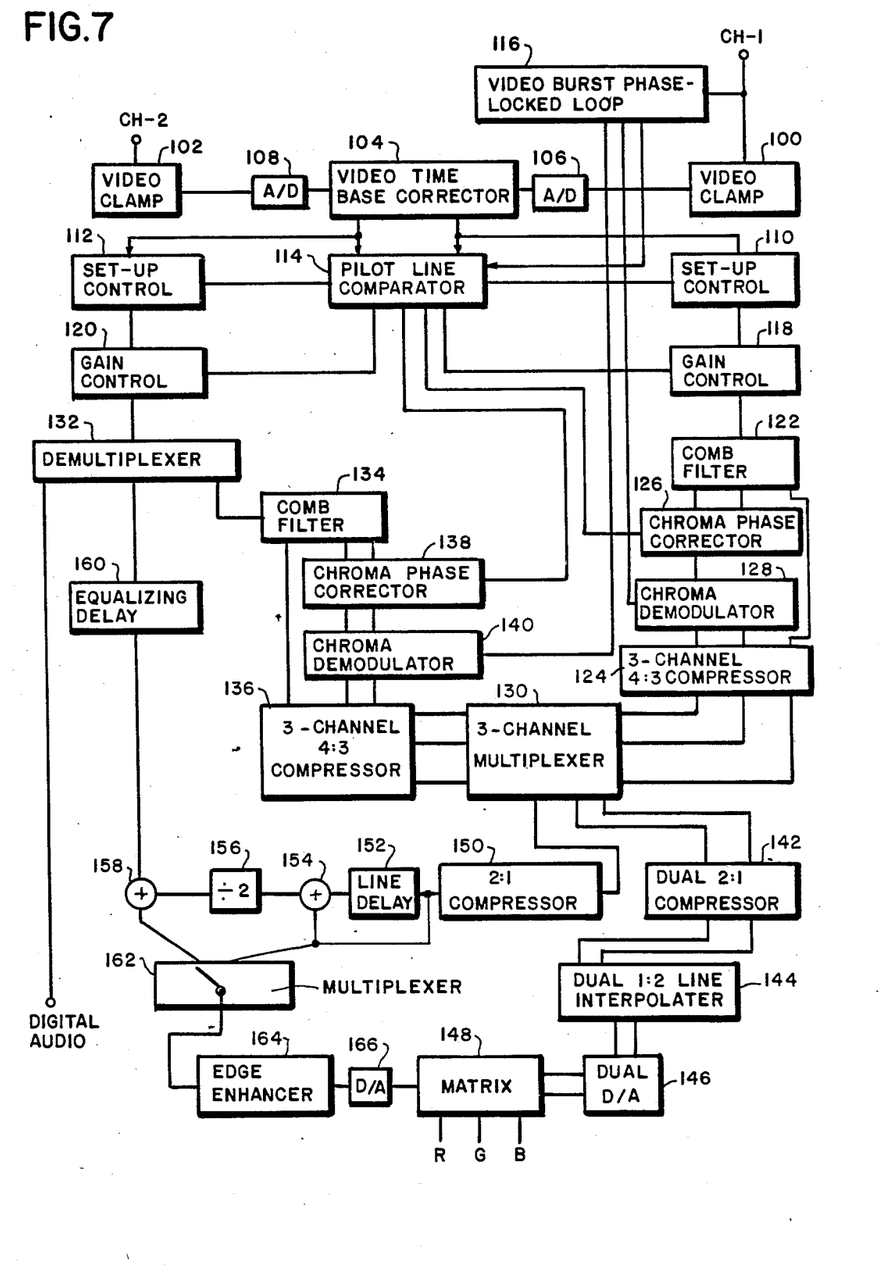
FIG. 7 shows, in block diagram form, an embodiment for converting the two transmission signals into a television signal which substantially corresponds to said high-definition television signal.

FIG. 7 shows an embodiment for an arrangement for recombining the first and second transmission signals for use in a high-definition television receiver.

After being received, the first and second transmission signals are applied to respective video clamp circuits 100 and 102 for application to a video timebase corrector circuit 104, after having first been digitized in analog-to-digital converters 106 and 108. The video timebase corrector circuit 104 compares the two transmission signals and synchronizes one with respect to the other by selectively delaying one or the other of the transmission signals. Respective outputs of the video timebase corrector circuit 104 are applied to respective set-up control circuits 110 and 112 which balance the brightness between the first and second transmission signals.

In order to match the first transmission signal to the second transmission signal, the outputs of the video timebase corrector circuit 104 are also applied to a video pilot line comparator 114 which extracts and compares the pilot lines in the first and second transmission signals to a standard pilot line and generates control signals for the set-up control circuits 110 and 112. A video burst phase-locked loop 116 receives the video burst signal in the first transmission signal and applies a timing signal to the video pilot line comparator 114.

The respective outputs of the set-up control circuits 110 and 112 are applied to respective gain control circuits 118 and 120, each of which having a control input connected to respective outputs of the video pilot line comparator 114. The output of the gain control circuit 118 is connected to a comb filter 122 which forms at its outputs the luminance and chrominance signals of the first transmission signal. The luminance signal is applied to a first input of a 3-channel 4:3 time compression circuit 124. The chrominance signals are first applied to a chroma phase correction circuit 126, having a control input connected to an output of the video pilot line comparator 114, and then to a chroma demodulator 128, having a timing signal input connected to an output of the video burst phase-locked loop 116. The outputs of the chroma demodulator 128, carrying the demodulated phase-corrected chrominance signals of the line segments a, c, e, etc., are connected to second and third inputs of the 3-channel 4:3 time compression circuit 124. The outputs of the 3-channel 4:3 time compression circuit 124 are applied to a first set of inputs of a 3-channel multiplexer 130.

The output of the gain control circuit 120 is applied to a demultiplexer 132 which, at a first output, provides the digital audio signal, at a second output, a signal representing the lines X1, X2, X3, etc., and at a third output, a signal representing the line segments al/ar, cl/cr, el/er, etc. This third output of the demultiplexer 132 is applied to a comb filter 134. The luminance output of the comb filter 134 is connected to a first input of a 3-channel 4:3 time compression circuit 136, while the chrominance outputs of the comb filter 134 are applied to a chroma phase corrector 138, having a control input connected to an output of the video pilot line comparator 114. The outputs of the chroma phase corrector 138 are connected to a chroma demodulator 140, having a timing signal input connected to an output of the video burst phase-locked loop 116, and then to a second and a third input of the 3-channel 4:3 time compression circuit 136. The outputs of the 3-channel 4:3 time compression circuits 136 are applied to a second set of inputs of the 3-channel multiplexer 130.

A first and second output of the 3-channel multiplexer 130, carrying the chrominance signals for the lines A, C, E, etc., are connected to a dual 2:1 time compression circuit 142, the outputs of which are connected to a dual 1:2 line interpolation circuit 144 which generates chrominance signals representing the lines A, B, C, D, etc. These chrominance signals are applied, via a dual digital-to-analog converter 146, to a first and second input of a matrix circuit 148. A third output of the 3-channel multiplexer 130, carrying the luminance signal for the lines A, C, E, etc., iis connected to a 2:1 time compression circuit 150, the output of which is applied to a line delay circuit 152. An adder circuit 154 receives, at its inputs, the input and the output of the line delay circuit 152 and applies this sum signal to a divide-by-2 divider 156 forming an average of the luminance signals representing the lines A, C, E, etc., for example, (A+C)/2, (C+E)/2, etc., which is applied to an input of an adder circuit 158. The second output of the demultiplexer 132 is applied to a delay equalization circuit 160 for equalizing any difference in the delay in the signal applied thereto and that of the average signal at the output of the divider 156, the output of the delay equalization circuit 160 being applied to another input of the adder circuit 158. This adder circuit 158 forms the luminance signal for the lines B, D, F, etc., in accordance with the formulae:

$$B = X1 + (A+C)/2$$

$$D = X2 + (C+E)/2$$

$$F = X3 + (E+G)/2$$

etc.

The output of the adder circuit 158 and the output of the 2:1 time compression circuit 150 are applied to respective inputs of a multiplexer 162 forming the luminance signal for the lines A, B, C, D, E, F, etc., which are applied first to an edge enhancement circuit 164 and then, via a digital-to-analog converter 166, to a third input of the matrix circuit 148. The matrix circuit 148 then forms the RGB signals for the high-definition television signal for application to a display having a 5⅓:3 aspect ratio.

Figure 8:
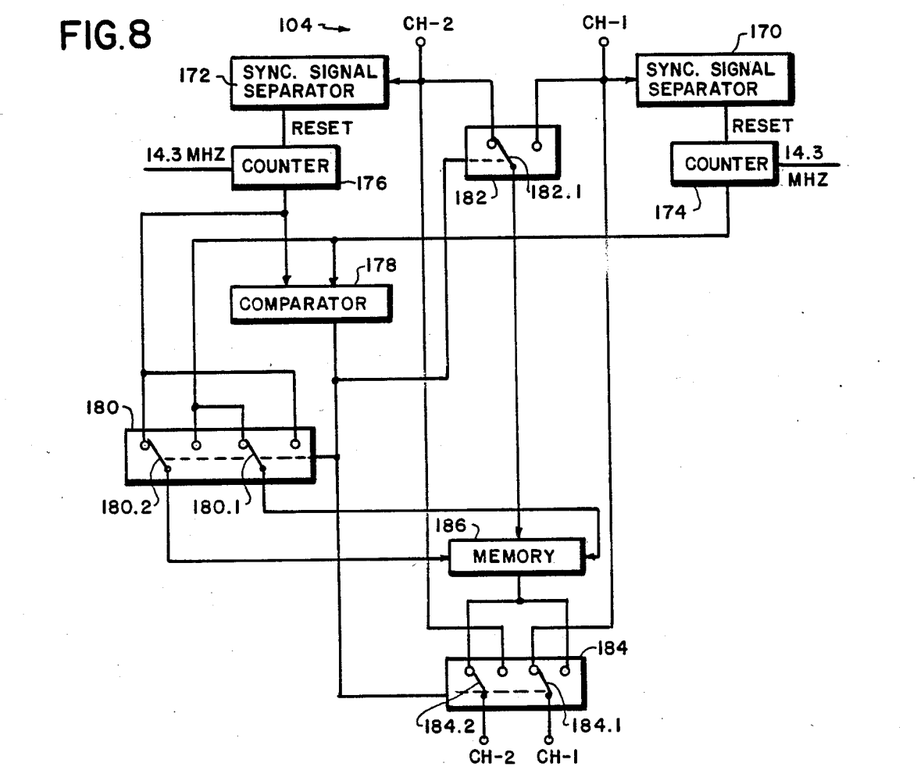
FIG. 8 shows, in block diagram form, an embodiment of a video timebase corrector for use in the circuit of FIG. 7.

FIG. 8 shows an embodiment of the video timebase corrector 104. The outputs from the video clamp circuits 100 and 102 are applied to synchronizing signal separating circuits 170 and 172, respectively, which apply the respective line synchronizing signals to the reset inputs of counters 174 and 176 which receive clocking signals of, for example, 14.3 MHz. The outputs of the counters 174 and 176 are applied as addresses to a comparator 178. The output of the counter 174 is further applied to a second and a third input of a controllable switch 180 while the output of the counter 176 is connected to a first and a fourth input of the controllable switch 180. The controllable switch 180 includes switching contacts 180.1 and 180.2 which switch between the first and second inputs and the third and fourth inputs thereof, respectively, under control of the output signal from the comparator 178.

The outputs of the video clamp circuits 100 and 102 are also applied to respective inputs of a controllable switch 182 and to a second and a third input, respectively, of a controllable switch 184. The switching contact 182.1 of switch 182, under control of the comparator 178 output, is connected to the data input of a memory 186, which receives write addresses from switching contact 180.1 and read addresses from switching contact 180.2.

The output of the memory 186 is applied to a first and a fourth input of switch 184 which includes switching contacts 184.1 and 184.2 for switching, under control of the comparator 178 output, between the first and second inputs and the third and fourth inputs, respectively, of the switch 184. These switching contacts 184.1 and 184.2 are then connected to the inputs of the set-up control circuits 110 and 112, respectively.

In operation, if the address from counter 176 is greater than the address from counter 174, then the video signal from video clamp circuit 102 is applied to the memory 186 and is delayed for the duration of the difference in the addresses; conversely, if the address from counter 174 is greater than the address from counter 176, then the video signal from video clamp circuit 100 is delayed in memory 186.

Figure 9:
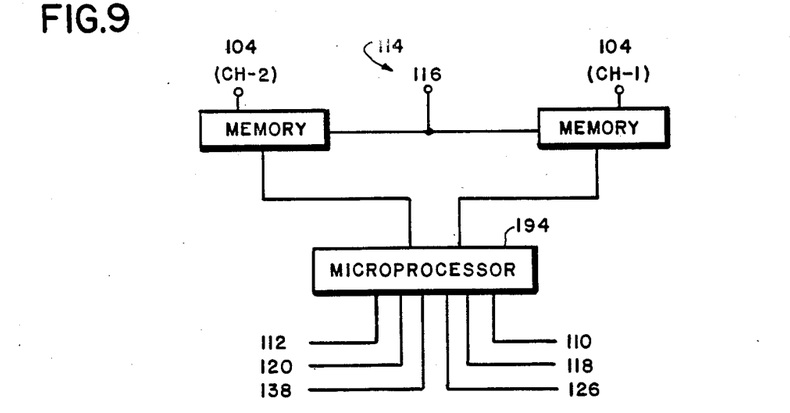
FIG. 9 shows, in block diagram form, an embodiment of a pilot line comparator also for use in the circuit of FIG. 8.

FIG. 9 shows a block diagram of the pilot line comparator 114. The output signals from switching contacts 184.1 and 184.2 of the video timebase corrector 104 are applied to respective pilot line capture memories 190 and 192 which extract the respective pilot lines from the respective first and second transmission signals. The outputs from the memories 190 and 192 are applied to a microprocessor 194 which compares each of these pilot lines to a standard pilot line and generates respective control signals for adjusting the brightness in the set-up control circuits 110 and 112, the contrast in the gain control circuits 118 and 120, and the hue in the chroma phase correctors 126 and 138.

Numerous alterations of structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit and scope of the invention are intended to be included within the appended claims.

What is claimed:

1. A television transmitter for transmitting a high-definition television signal containing picture information which, on display, forms first picture frames at a rate of 2n frames per second, where n is a standard number of picture frames per second formed by the picture information in a standard television signal, and having a width which is wider than that of a standard aspect ratio picture frame, said high-definition television signal having a bandwidth greater than that of a standard television signal, each of said first picture frames including a single field having m sequentially scanned scanning lines, where m is a standard number of scanning lines in each picture frame formed by the picture information in said standard television signal in which said scanning lines are arranged in two interlaced fields; characterized in that said television transmitter comprises:

first means for converting said high-definition television signal into a first transmission signal compatible with standard television receivers and containing first picture information derived from the picture information in said high-definition television signal forming substantially a first half of the scanning lines in said first picture frames, said first picture information forming, on display, second picture frames each of which having m interlaced scanning lines in two fields and corresponding to a selected portion of said first picture frames having a standard aspect ratio;

second means for converting said high-definition television signal into a second transmission signal containing second picture information derived from the picture information in said high-definition television signal forming substantially a second half of the scanning lines in said first picture frames and forming a portion of said first picture frames not included in said selected portion in said second picture frames, said second picture information forming, on display, third picture frames each of which having m scanning lines in two fields, whereby said first and second picture information collectively include substantially all of the picture information in said high-definition television signal;

means for modulating said first and said second transmission signals onto a first and second carrier, respectively; and means for simultaneously transmitting said first and said second modulated carriers.

2. A method of transmitting a high-definition television (HDTV) signal comprising the steps of:

forming said HDTV signal with sequentially scanned scan lines representing picture information, a frame of said HDTV signal being formed at twice the rate of a frame of a standard television (TV) signal;

converting said HDTV signal into a first transmission signal and a second transmission signal, at least said first transmission signal being compatible with a standard TV receiver, wherein during a first frame of the HDTV signal said first transmission signal comprises information representing odd ones of said scan lines and said second transmission signal comprises information representing the remaining portion of the picture information of said first frame, and during a second frame of the HDTV signal said first and second transmission signals comprise even ones of said scan lines and the remaining portion of the picture information of said second frame, respectively; and transmitting said first and second transmission signals.

3. A high-definition television (HDTV) transmitter for transmitting an HDTV signal, said HDTV transmitter comprising:

forming means for forming said HDTV signal with sequentially scanned scan lines representing picture information, a frame of said HDTv signal being formed at twice the rate of a frame of a standard television (TV) signal;

first and second converting means coupled to said forming means, for converting said HDTV signal into a first transmission signal and a second transmission signal, respectively, at least said first transmission signal being compatible with a standard TV receiver, wherein during a first frame of the HDTV signal said first transmission signal comprises information representing odd ones of said scan lines and said second transmission signal comprises information representing the remaining portion of the picture information of said first frame, and during a second frame of the HDTV signal said first and second transmission signals comprise even ones of said scan lines and the remaining portion of the picture information of said second frame, respectively; and transmitting means coupled to said first and second converting means, for transmitting said first and second transmission signals.

4. A high-definition television (HDTV) receiver for receiving transmitted first and second transmission signals into which an HDTV signal is converted, said HDTV signal having sequentially scanned scan lines r(R)presenting picture information, a frame rate twice the rate of a frame of a standard television (TV) signal, at least said first transmission signal being compatible with a standard TV receiver, wherein during a first frame of the HDTV signal said first transmission signal comprises information representing odd ones of said scan lines and said second transmission signal comprises information representing the remaining portion of the picture information of said first frame, and during a second frame of the HDTV signal said first and second transmission signals comprise even ones of said scan lines and the remaining portion of the picture information of said second frame, respectively, said HDTV receiver comprising:

receiving means for receiving said frist and second transmission signals; and combining means coupled to said receiving means, for combining said first and second transmission signals to reconstruct said HDTV signal.

5. A method of transmitting a high-definition television (HDTV) signal comprising the steps of:

forming said HDTV signal with sequentially scanned scan lines representing picture information, a frame of said HDTV signal being formed at twice the rate of a frame of a standard television (TV) signal, and the aspect ratio of said HDTV signal being wider than that of said standard TV signal;

converting said HDTV signal into a first transmission signal and a second transmission signal, at least said first transmission signal being compatible with a standard TV receiver, wherein during a first frame of the HDTV signal said first transmission signal comprises first information representing a portion of odd ones of said scan lines and said second transmission signal comprises second information representing a portion of even ones of said scan lines, and said second transmission signal further comprises third information, said first, second and third infomations representing all information of said HDTV signal, and during a second frame of the HDTV signal said first and second transmission signals comprise said second information, and said first and third informations, respectively; and transmitting said first and second transmission signals.

6. A high-definition television (HDTV) transmitter for transmitting an HDTV signal, said HDTV transmitter comprising:

forming means for forming said HDTV signal with sequentially scanned scan lines representing picture information, a frame of said HDTV signal being formed at twice the rate of a frame of a standard television (TV) signal, and the aspect ratio of said HDTV signal being wider than that of said standard TV signal;

first and second converting means coupled to said forming means, for converting said HDTV signal into a first transmission signal and a second transmission signal, respectively, at least said first transmission signal being compatible with a standard TV receiver, wherein during a first frame of the HDTV signal said first transmission signal comprises first information representing a portion of odd ones of said scan lines and said second transmission signal comprises second informaton representing a portion of even ones of said scan lines, and said second transmission signal further comprises third information, said first, second and third informations representing all information of said HDTV signal, and during a second frame of the HDTV signal said first and second transmission signals comrise said second information, and said first and third informations, respectively; and transmitting means coupled to said first and second converting means, for transmitting said first and second transmission signals.

7. A high-definition television (HDTV) receiver for receiving transmitted first and second transmission signals into which an HDTV signal is converted, said HDTV signal having sequentially scanned scan lines representing picture information, a frame rate twice the rate of a frame of a standard telvision (TV) signal, the aspect ratio of said HDTV signal being wider than that of said standard TV signal, at least said first transmission signal being compatible with a standard TV receiver, wherein during a first frame of the HDTV signal said first transmission signal comprises first information representing a portion of odd ones of said scan lines and said second transmission signal comprises second information representing a portion of even ones of said scan lines, and said second transmission signal further comprises third information, said first, second and third informations representing all information of said HDTV signal, and during a second frame of the HDTV signal said first and second transmission signals comprise said second information, and said first and third informations, respectively, said HDTV receiver comprising:

receiving means for receiving said first and second transmission signals; and combining means coupled to said receiving means, for combining said first and second transmission signals to reconstruct said HDTV signal.

* * * * *

UNITED STATES PATENT AND TRADEMARK OFFICE
CERTIFICATE OF CORRECTION

PATENT NO. : 4,794,456
DATED : December 27, 1988
INVENTOR(S) : Mikhail Tsinberg

It is certified that error appears in the above—identified patent and that said Letters Patent is hereby corrected as shown below:

Claim 3, line 6    change "HDTv" to --HDTV--;

line 10    change "converiing" to --converting--;

Claim 4, line 4    change "lin(R)s" to --lines--;

line 5    change "r(R)presenting" to --representing--;

Claim 6, line 20    change "informaton" to --information--;

line 27    change "comrise" to --comprise--.

Signed and Sealed this

Eighth Day of August, 1989

*Attest:*

DONALD J. QUIGG

*Attesting Officer*    *Commissioner of Patents and Trademarks*